(12) United States Patent
Masuda

(10) Patent No.: US 11,060,576 B2
(45) Date of Patent: Jul. 13, 2021

(54) ELECTRIC LINEAR MOTION ACTUATOR

(71) Applicant: NTN CORPORATION, Osaka (JP)

(72) Inventor: Yui Masuda, Iwata (JP)

(73) Assignee: NTN CORPORATION, Osaka (JP)

(*) Notice: Subject to any disclaimer, the term of this patent is extended or adjusted under 35 U.S.C. 154(b) by 250 days.

(21) Appl. No.: 16/198,505

(22) Filed: Nov. 21, 2018

(65) Prior Publication Data

US 2019/0093720 A1    Mar. 28, 2019

Related U.S. Application Data

(63) Continuation of application No. PCT/JP2017/018776, filed on May 19, 2017.

(30) Foreign Application Priority Data

May 26, 2016  (JP) .............................. JP2016-105369

(51) Int. Cl.
*F16D 65/18* (2006.01)
*H02K 7/06* (2006.01)
(Continued)

(52) U.S. Cl.
CPC .............. *F16D 65/18* (2013.01); *B60T 13/74* (2013.01); *H02K 7/06* (2013.01); *H02K 7/102* (2013.01);
(Continued)

(58) Field of Classification Search
CPC .. F16D 65/18; F16D 2121/24; F16D 2125/40; H02K 11/30; H02K 7/06;
(Continued)

(56) References Cited

U.S. PATENT DOCUMENTS 7,810,616 B2   10/2010 Nakazeki
9,353,837 B2   5/2016 Yamasaki et al.
(Continued)

FOREIGN PATENT DOCUMENTS

CN      1741352 A    3/2006
CN    101103215 A    1/2008
(Continued)

OTHER PUBLICATIONS

International Search Report dated Aug. 1, 2017 in corresponding International Application No. PCT/JP2017/018776.
(Continued)

*Primary Examiner* — Melanie Torres Williams

(57) ABSTRACT

The linear motion mechanism and the electric motor are arranged in the axial direction with a rotary input-output shaft of the linear motion mechanism interposed therebetween. In the electric motor, orientation of a magnetic pole generating interlinkage flux is parallel with a rotation shaft of the motor. The linear motion mechanism has a thrust bearing for retaining a reaction force against a load in the axial direction in association with linear motion of the linear motion part. The control unit has a thrust force applying section for applying a thrust force such that a force acting in the axial direction of the rotary input-output shaft due to interlinkage flux between the stator and the rotor causes generation of a force, in the axial direction, acting on the thrust bearing.

9 Claims, 6 Drawing Sheets

(51) Int. Cl.
  *H02K 7/102* (2006.01)
  *B60T 13/74* (2006.01)
  *H02P 25/024* (2016.01)
  *H02K 11/30* (2016.01)
  *H02K 21/24* (2006.01)
  *F16D 121/24* (2012.01)
  *F16D 125/40* (2012.01)

(52) U.S. Cl.
  CPC ............ *H02K 11/30* (2016.01); *H02K 21/24* (2013.01); *H02P 25/024* (2016.02); *F16D 2121/24* (2013.01); *F16D 2125/40* (2013.01)

(58) Field of Classification Search
  CPC .......... H02K 7/102; H02K 21/24; H02K 1/27; H02K 1/2793; H02P 25/024
  See application file for complete search history.

(56) References Cited

U.S. PATENT DOCUMENTS

| | | | |
|---|---|---|---|
| 9,435,411 | B2 | 9/2016 | Eguchi et al. |
| 9,475,469 | B2 | 10/2016 | Takahashi et al. |
| 9,970,449 | B2 | 5/2018 | Yamasaki et al. |
| 2006/0049712 | A1 | 3/2006 | Zepp et al. |
| 2006/0043804 | A1 | 5/2006 | Kondou |
| 2008/0110704 | A1 | 5/2008 | Nakazeki |
| 2009/0236157 | A1* | 9/2009 | Akamatsu ............... F16D 65/18 180/55 |
| 2012/0133231 | A1* | 5/2012 | Hayakawa ............. H02K 21/24 310/156.37 |
| 2013/0087417 | A1 | 4/2013 | Yu et al. |
| 2013/0292215 | A1 | 11/2013 | Eguchi et al. |
| 2014/0158479 | A1 | 6/2014 | Takahashi et al. |
| 2014/0290402 | A1 | 10/2014 | Yamasaki et al. |
| 2014/0312728 | A1* | 10/2014 | Azuma .................. H02K 7/003 310/112 |
| 2015/0262610 | A1* | 9/2015 | Lin .................... G11B 19/2009 360/99.08 |
| 2016/0131212 | A1 | 5/2016 | Yamasaki et al. |

FOREIGN PATENT DOCUMENTS

| | | |
|---|---|---|
| CN | 103348163 | 10/2013 |
| CN | 103958934 | 7/2014 |
| CN | 105324588 | 2/2016 |
| EP | 0 632 181 A1 | 1/1995 |
| EP | 1 630 450 A1 | 3/2006 |
| EP | 1 837 555 A1 | 9/2007 |
| EP | 2 733 379 A1 | 5/2014 |
| JP | 50-33406 | 3/1975 |
| JP | 6-169553 | 6/1994 |
| JP | 2003-247576 | 9/2003 |
| JP | 2008-172884 | 7/2008 |
| JP | 2010-270788 | 12/2010 |
| JP | 2011-130565 | 6/2011 |
| JP | 5185278 | 1/2013 |
| JP | 2014-036490 | 2/2014 |
| JP | 2014-206286 | 10/2014 |
| JP | 2016-55849 | 4/2016 |

OTHER PUBLICATIONS

English Translation of the International Preliminary Report on Patentability dated Dec. 6, 2018 in corresponding International Patent Application No. PCT/JP2017/018776, 8 pages.
Notice of Reasons for Refusal dated Apr. 28, 2020, in corresponding Japanese Patent Application No. 2016-105369 (4 pages).
Chinese Office Action dated Dec. 2, 2019 in corresponding Chinese Patent Application No. 201780031698.5.
Extended European Search Report dated Dec. 4, 2019 in corresponding European Patent Application No. 17802691.0.
Office Action, dated Sep. 2, 2020, in corresponding Chinese Application No. 201780031698.5 (19 pp.).
European Communication dated Feb. 8, 2021, in European Patent Application No. 17802691.0 (5 pages).

* cited by examiner

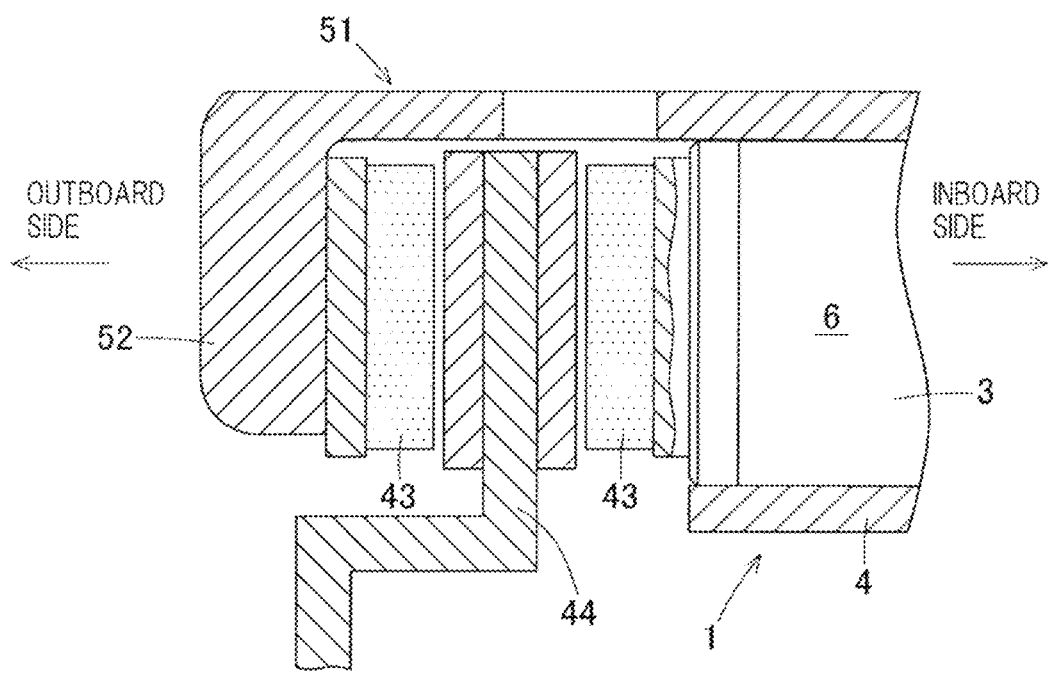

ELECTRIC LINEAR MOTION ACTUATOR

CROSS REFERENCE TO THE RELATED APPLICATION

This application is a continuation application, under 35 U.S.C. § 111(a), of international application No. PCT/JP2017/018776, filed May 19, 2017, which is based on and claims Convention priority to Japanese patent application No. 2016-105369, filed May 26, 2016, the entire disclosure of which is herein incorporated by reference as a part of this application.

BACKGROUND OF THE INVENTION

Field of the Invention

The present invention relates to an electric linear motion actuator applicable to an electric brake device, for example.

Description of Related Art

Electric actuators and electric motors are proposed in the following documents.
1. An electric disk brake device in which, on the outer circumference of a linear motion part, an electric motor is arranged coaxially with the linear motion part (Patent Document 1).
2. An electric brake device in which an electric motor is arranged on a shaft different from a rotation shaft of a linear motion mechanism so as to be parallel with the rotation shaft (Patent Document 2).
3. A double stator axial gap motor having eight poles and nine slots (Patent Document 3).

RELATED DOCUMENT

Patent Document

[Patent Document 1] JP Laid-open Patent Publication No. 2003-247576
[Patent Document 2] JP Laid-open Patent Publication No. 2010-270788
[Patent Document 3] JP Laid-open Patent Publication No. 2008-172884

In general, for such an electric brake device using the electric linear motion actuator as described in Patent Documents 1 and 2, a space in which the electric brake device is installed in a vehicle is extremely limited. The function of the electric brake device needs to be implemented in a possible smallest space. For example, in wheel speed control or the like, which is typified by an antilock brake system (abbreviated as ABS), high-speed and high-precision braking force control is required for an electric brake.

For example, in a structure in which an electric motor is arranged on the outer circumference of an actuator as in Patent Document 1, the rotor diameter of the electric motor is increased, and thus, the moment of inertia is increased so that the responsiveness and the control accuracy may be deteriorated. Since the kinetic energy required for rotation of the rotor is proportional to the moment of inertia, instantaneous maximum power consumption for achieving high-speed response increases, and thus the cost of the power supply device for supplying power can rise. Furthermore, for example, in an electric disk brake device, the temperature of an object, such as a friction pad, to be pressed to a brake disk by an actuator becomes extremely high. In this case, since an electric motor is close to a heat source, a problem with the durability may arise.

For example, in a case where an electric motor and a linear motion actuator are arranged in parallel with each other as in Patent Document 2, the electric motor and the linear motion actuator each have a cylindrical outer appearance in many cases in general, and the two cylinders thereof are arranged adjacent to each other. This may form a certain amount of dead space in a gap therebetween. Further, a linking mechanism such as a parallel gear is needed between the electric motor and the linear motion actuator, irrespective of required specifications, and this may increase the cost. In addition, respective support structures are needed for the electric motor and the linear motion actuator, so that problems relating to space and cost may arise.

As a motor structure for achieving high torque while saving space, an axial gap synchronous motor as disclosed in Patent Document 3 has been known, for example. In general, however, an axial gap motor is likely to generate a large thrust force in the rotation axial direction due to a gap imbalance between a rotor and a stator, an imbalance in a magnetic circuit, or the like. For this reason, a support structure against the thrust force becomes complicated, so that the cost may be increased.

SUMMARY OF THE INVENTION

An object of the present invention is to provide an electric linear motion actuator which enables space saving, simplification of a support structure against thrust force, and reduction of cost.

Hereinafter, the present invention will be described by referring to reference numerals used in embodiments for convenience sake in order to facilitate understanding.

An electric linear motion actuator 1 according to a first aspect of the present invention includes: an electric motor 2; a linear motion mechanism 3, having a rotary input-output shaft 5, configured to convert rotary motion of the electric motor 2 to linear motion of a linear motion part 6 via the rotary input-output shaft 5; a housing 4 configured to hold the linear motion mechanism 3; and a control unit CU configured to control the electric motor 2.

The linear motion mechanism 3 and the electric motor 2 are arranged in an axial direction with the rotary input-output shaft 5 of the linear motion mechanism 3 interposed therebetween.

The electric motor 2 has a stator 7 and a rotor 8 that are arranged such that orientation of a magnetic pole which generates interlinkage flux contributing to generating torque is parallel with a rotation shaft in the electric motor 2.

The linear motion mechanism 3 has a thrust bearing 34 for retaining a reaction force against a load in the axial direction in association with linear motion of the linear motion part 6.

The control unit CU is provided with a thrust force applying section 54 for applying a thrust force such that a force acting in the axial direction of the rotary input-output shaft 5 due to interlinkage flux between the stator 7 and the rotor 8 causes generation of a force, in the axial direction, acting on the thrust bearing 34.

According to this configuration, the electric motor 2 is a so-called axial gap motor provided with the stator 7 and the rotor 8 arranged such that orientation of the magnetic pole which generates interlinkage flux contributing to generating torque is parallel with the rotation shaft of the electric motor 2. Further, the linear motion mechanism 3 and the electric motor 2 are arranged in the axial direction with the rotary input-output shaft 5 of the linear motion mechanism 3 interposed therebetween. Therefore, it is possible to realize an electric linear motion actuator that allows space saving to be achieved by reducing an unnecessary space, and allows a moment of inertia to be reduced and responsiveness to be enhanced as compared with, for example, a structure in which an electric motor is disposed, for example, on the outer circumference of the actuator.

An axial gap motor is generally known to be capable of generating a high thrust force as compared with, for example, a radial gap motor having magnetic poles in the radial direction of the rotation shaft. In this configuration, the thrust bearing 34 of the linear motion mechanism 3 retains a reaction force against a load in the axial direction in association with linear motion of the linear motion part 6, that is, retains one of thrust forces in the axial direction. However, the thrust bearing 34 is not capable of bearing the other of the thrust forces in the axial direction.

Thus, the control unit CU is provided with the thrust force applying section 54. The thrust force applying section 54 applies a thrust force such that the sum of the force acting in the axial direction of the rotary input-output shaft 5 due to interlinkage flux between the stator 7 and the rotor 8 causes generation of a force, in the axial direction, acting on the thrust bearing 34. In this manner, a thrust force is intentionally applied to the linear motion mechanism 3 in such a direction that the thrust force of the axial gap motor can be supported by the existing thrust bearing 34. This makes it possible to simplify a support structure for a thrust force, and to reduce the cost.

The rotation shaft of the electric motor 2 may be disposed coaxially with the rotary input-output shaft 5 of the linear motion mechanism 3. In this case, the rotary input-output shaft 5 of the linear motion mechanism 3 can serve also as a rotation shaft of the electric motor 2. This makes it possible to reduce the number of components associated with supporting of a thrust force, and to achieve space saving and cost reduction.

The rotor 8 may be a magnetic field mechanism having torque generating surfaces on both surfaces, respectively, in the axial direction of the rotor 8.

The stators 7 may be disposed on both the surfaces, respectively, in the axial direction, of the magnetic field mechanism, and may have a pair of excitation mechanisms 7A, 7B for which excitation magnetic flux can be independently controlled.

The thrust force applied by the thrust force applying section 54 may be an electromagnetic force generated by the excitation magnetic fluxes of the pair of excitation mechanisms 7A, 7B satisfying different magnetic flux conditions, respectively.

The magnetic flux condition is a magnetic flux condition that is optionally determined by designing or the like, and is determined, for example, by calculating an appropriate magnetic flux condition by either or both of a test and a simulation.

In this case, a so-called double stator type in which the stator 7 has the pair of excitation mechanisms 7A, 7B that are respectively disposed on both surfaces, in the axial direction, of the magnetic field mechanism, is used. For each of the pair of excitation mechanisms 7A, 7B, the excitation magnetic flux can be independently controlled, and the thrust force applying section 54 enables generation of a force, in the axial direction, acting on the thrust bearing 34 by the excitation magnetic fluxes of the pair of excitation mechanisms 7A, 7B satisfying different magnetic flux conditions, respectively. Therefore, it is possible to simplify the support structure for a thrust force.

The rotor 8 may be a magnetic field mechanism having a permanent magnet 8*a*.

One or both of the pair of excitation mechanisms 7A, 7B may have coils 11A, 11B that form a magnetic circuit corresponding to three-phase alternating current.

The thrust force applying section 54 may have a function of controlling current amplitude and phase of the three-phase alternating current of the coils 11A, 11B that are independent of each other with respect to the magnetic poles of the magnetic field mechanism, or values corresponding thereto.

The thrust force applied by the thrust force applying section 54 may be an electromagnetic force generated by a current component of the coil 11A, 11B corresponding to the excitation magnetic flux in a direction corresponding to the magnetic pole of the magnetic field mechanism.

The "values corresponding thereto" are, for example, current values in the d axis and q axis in the current vector control of a synchronous motor. The "direction corresponding to the magnetic pole of the magnetic field mechanism" includes a direction almost matching the magnetic pole of the magnetic field mechanism, that is, the direction regarded as substantially matching the magnetic pole of the magnetic field mechanism.

According to this configuration, when the thrust force applying section 54 applies, for example, a d-axis current that weakens the excitation magnetic flux, a repulsive force is generated between the stator 7 and the rotor 8, whereas when the thrust force applying section 54 applies a d-axis current that enhances the excitation magnetic flux, an attractive force is generated between the stator 7 and the rotor 8. Thus, the thrust force applying section 54 adjusts the d-axis current in the stators on the both sides in the axial direction such that an electromagnetic force is generated in the direction for acting on the thrust bearing 34. As a result, the rotary input-output shaft 5 that is restrained relative to the rotor 8 is pressed against the thrust bearing 34 and the axial position thereof is retained.

The control unit CU may have an axial force estimation functional part 60 that estimates an axial force of the linear motion mechanism 3, and the thrust force applying section 54 may cause generation of the electromagnetic force by adjusting the excitation magnetic flux when the axial force of the linear motion mechanism 3 estimated by the axial force estimation functional part 60 is less than or equal to a predetermined magnitude.

The "predetermined magnitude" is determined, for example, by calculating an estimated axial force that is optionally determined by designing or the like and, for example, an appropriate estimated axial force by either or both of a test and a simulation. The estimated axial force can be estimated, for example, from the relationship between the current and the angle of the electric motor.

When the axial force of the linear motion mechanism 3 exceeds the predetermined magnitude, the rotary input-output shaft of the linear motion actuator and the electric motor is restrained relative to the housing by the axial force, so that it is not necessary for the thrust force applying section 54 to apply a thrust force. By restricting the thrust force to be applied in this manner, unnecessary power consumption can be reduced.

In the electric linear motion actuator, the electric motor 2 may further include a thrust force generator 68 for generating a thrust force such that the force acting in the axial direction of the rotary input-output shaft 5 due to interlinkage flux between the stator 7 and the rotor 8 causes generation of a force, in the axial direction, acting on the thrust bearing 34. In this case, when malfunction occurs in either one of the operation by the thrust force applying section 54 and the operation by the thrust force generator 68, a backup function can be carried out, and/or a fail-safe function can be carried out, by the other of the section and generator.

An electric linear motion actuator according to a second aspect of the present invention includes: an electric motor; a linear motion mechanism, having a rotary input-output shaft, configured to convert rotary motion of the electric motor to linear motion of a linear motion part via the rotary input-output shaft; and a housing configured to hold the linear motion mechanism.

The linear motion mechanism and the electric motor are arranged in an axial direction with the rotary input-output shaft of the linear motion mechanism interposed therebetween.

The electric motor has a stator and a rotor arranged such that orientation of a magnetic pole which generates interlinkage flux contributing to generating torque is parallel with a rotation shaft in the electric motor.

The linear motion mechanism has a thrust bearing for retaining a reaction force against a load in the axial direction in association with linear motion of the linear motion part.

The electric motor includes a thrust force generator for generating a thrust force such that a force acting in the axial direction of the rotary input-output shaft due to interlinkage flux between the stator and the rotor causes generation of a force, in the axial direction, acting on the thrust bearing.

According to this configuration, the electric motor is an axial gap motor, similarly to the electric linear motion actuator according to the first aspect of the invention. Further, the linear motion mechanism and the electric motor are arranged in the axial direction with the rotary input-output shaft of the linear motion mechanism interposed therebetween. Therefore, it is possible to realize an electric linear motion actuator that allows space saving to be achieved by reducing an unnecessary space, and allows a moment of inertia to be reduced and responsiveness to be enhanced as compared with, for example, a structure in which an electric motor is disposed, for example, on the outer circumference of the actuator.

The thrust force generator generates a thrust force such that the sum of the force acting in the axial direction of the rotary input-output shaft due to interlinkage flux between the stator and the rotor causes generation of a force, in the axial direction, acting on the thrust bearing. In this manner, a thrust force is intentionally generated for the linear motion mechanism in such a direction that the thrust force of the axial gap motor can be supported by the existing thrust bearing. This makes it possible to simplify a support structure for a thrust force, and to reduce the cost.

One of the stator and the rotor has torque generating surfaces on both surfaces, respectively, in the axial direction, and the other of the stator and the rotor is arranged on each side, in the axial direction, facing the one of the stator and the rotor having the torque generating surfaces.

The thrust force generator may be configured to have a positional relationship such that gaps between the stator and the rotor differ in size in the torque generating surfaces, and the thrust force generated by the thrust force generator may be generated by imbalance, depending on the size of each gap, of magnetic attractive force in the torque generating surfaces.

In this case, the electric motor is of a double stator type or a double rotor type, and is configured to have a positional relationship such that gaps between the stator and the rotor differ in size for the torque generating surface. Therefore, a force is generated in a predetermined direction depending on imbalance in magnetic attractive force of the field magnetic flux. By conforming the predetermined direction to the direction for acting on the thrust bearing, the axial position of the rotary input-output shaft that is restrained relative to the rotor is constantly retained by the thrust bearing.

Each of the stator and the rotor may have a torque generating surface on either one surface, in the axial direction, the one surfaces of the stator and the rotor facing each other, the force acting in the axial direction of the rotary input-output shaft may be an attractive force acting between the rotor and the stator, and the thrust force generator may cause generation of the thrust force by the stator and the rotor being arranged in such a positional relationship that the attractive force is generated in the axial direction for acting on the thrust bearing.

In this case, the electric motor is of a single stator type or a single rotor type, and further allows space saving in the axial direction to be achieved. By the stator and the rotor being arranged in such a direction that the attractive force by the field magnetic flux acts on the thrust bearing, it is possible to reliably support the thrust force of the axial gap motor by the thrust bearing.

The electric brake device according to the present invention includes any one of the aforementioned electric linear motion actuators, a brake rotor, and a friction member configured to generate a braking force by coming into contact with the brake rotor. According to this configuration, the electric linear motion actuator allows space saving to be achieved. Thus, the electric brake device can be mounted also in a vehicle in which a mounting space for the electric linear motion actuator is extremely limited. Consequently, availability of the electric brake device can be enhanced so that the electric brake device can be mounted in various vehicles. Since the electric linear motion actuator allows the support structure for a thrust force to be simplified and allows cost to be reduced, it is possible to reduce the cost for the entirety of the electric brake device.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 7 is a partially cutaway longitudinal-sectional view of an electric brake device provided with either of the electric linear motion actuators.

DESCRIPTION OF EMBODIMENTS

Figure 1:
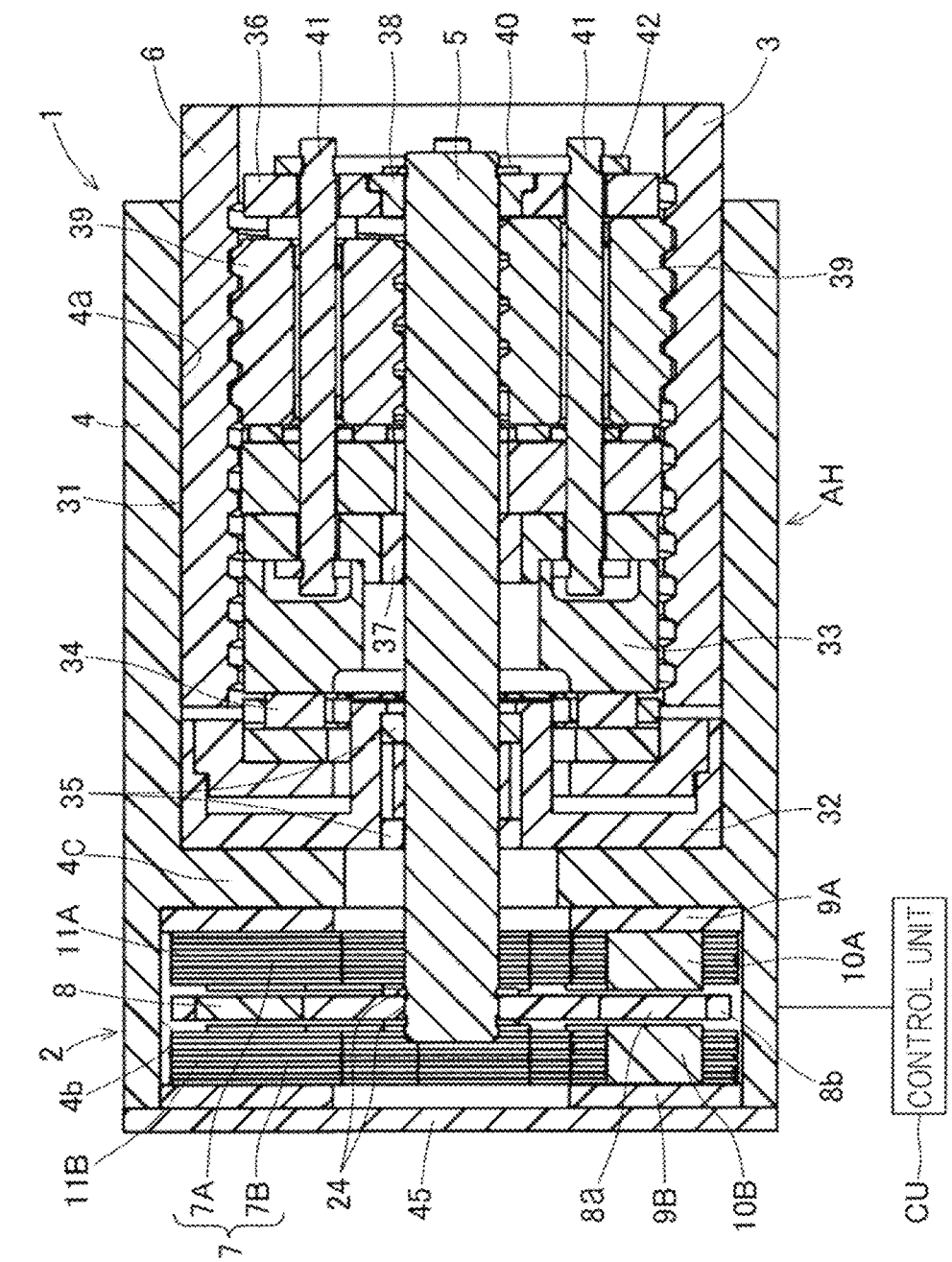
FIG. 1 is a longitudinal-sectional view of an electric linear motion actuator according to one embodiment of the present invention.
Figure 2:
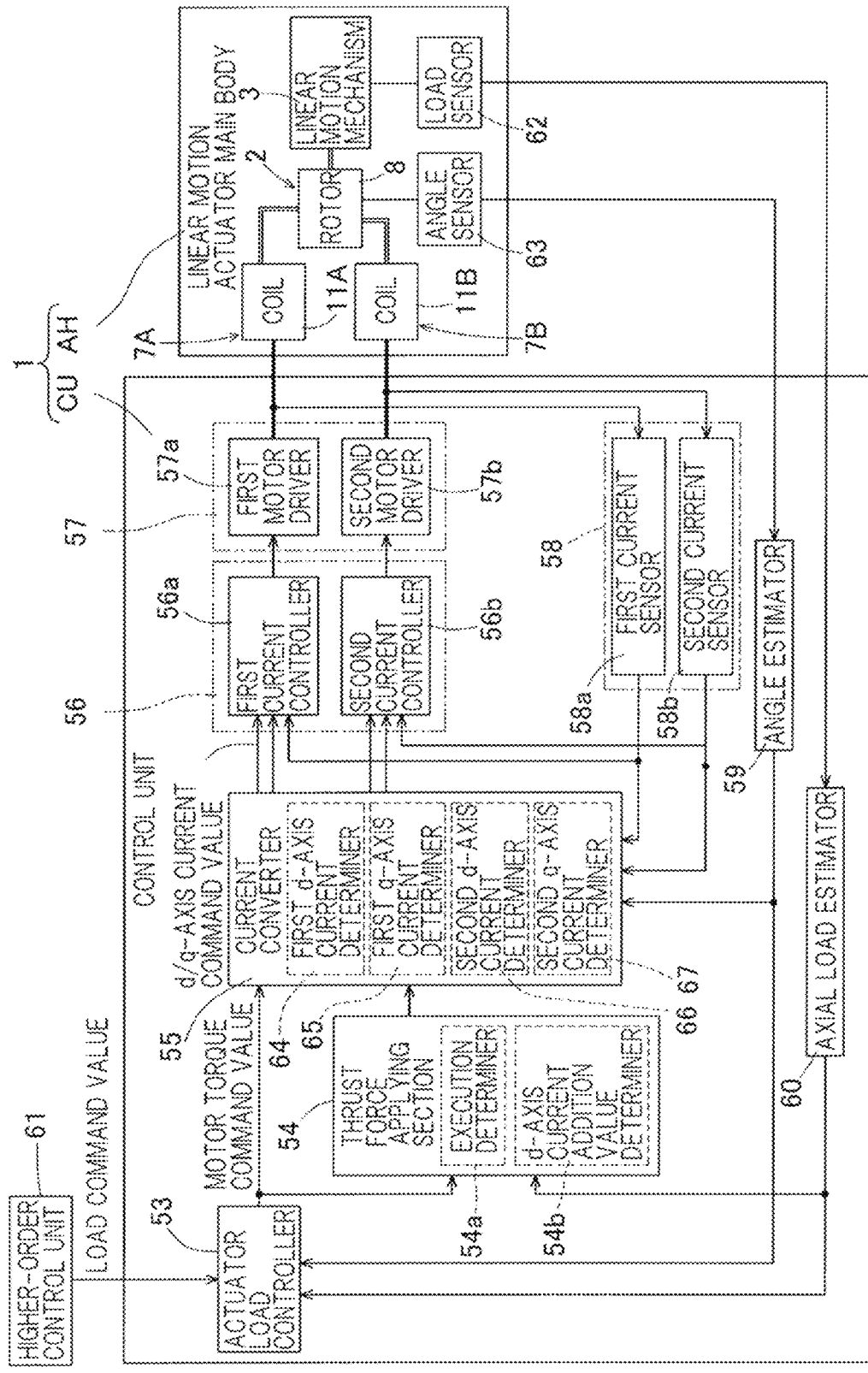
FIG. 2 is a block diagram showing a configuration example of a control system of the electric linear motion actuator.
Figure 3:
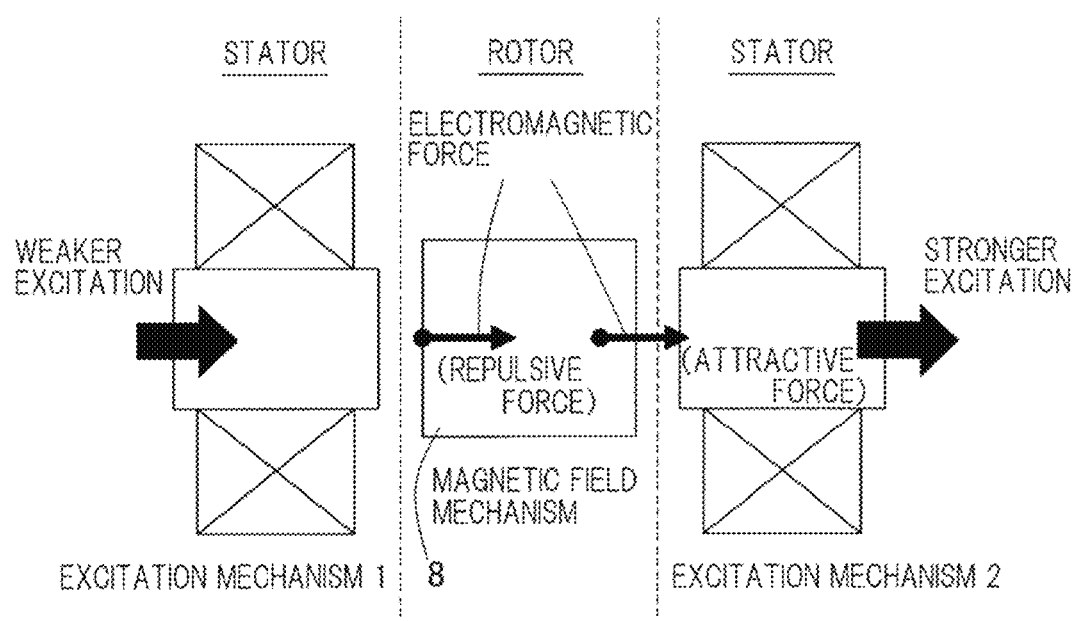
FIG. 3 is a view schematically showing a principle for intentionally generating an axial force in an axial gap motor of the electric linear motion actuator.

Referring to FIG. 1 to FIG. 3, an electric linear motion actuator according to an embodiment of the present invention is described. The electric linear motion actuator is applied in an electric brake device (described later) mounted in a vehicle, for example. As illustrated in FIG. 1, an electric linear motion actuator 1 includes an electric motor 2 and a linear motion mechanism 3 which are connected in series in the axial direction. The electric linear motion actuator 1 includes a linear motion actuator main body AH, and a control unit CU described later. The linear motion actuator main body AH includes the electric motor 2, the linear motion mechanism 3, and a housing 4. The electric motor 2 of the present embodiment is a double stator type axial gap motor. The linear motion mechanism 3 has a linear motion part 6, and converts rotary motion of the motor 2 to linear motion of the linear motion part 6 via a rotary input-output shaft 5. The housing 4 holds the linear motion mechanism 3 and the electric motor 2. Illustration of some components such as wiring is omitted for simplification in FIG. 1.

The electric motor 2 will be described. The electric motor 2 is a so-called axial gap type motor provided with a stator 7 and a rotor 8 arranged such that orientation of magnetic poles thereof, which generate interlinkage flux contributing to generating torque, are parallel with the rotation shaft of the electric motor 2. The stator 7 is held statically with respect to the housing 4. The rotor 8 is held statically with respect to the rotary input-output shaft 5 of the linear motion mechanism 3, and generates rotational torque by interlinkage flux generated between the rotor 8 and the stator 7 which is arranged so as to have a space therefrom. The rotor 8 is a magnetic field mechanism having torque generating surfaces respectively on both surfaces, in the axial direction, of the rotor 8. The aforementioned term "statically" means the relationship for substantially synchronous motion, with the influence of a clearance or the like being excluded (in other words, relatively restrained).

The electric motor 2 is disposed in the cylindrical housing 4. In the housing 4, a linear motion mechanism accommodating part 4a that accommodates the most part of the linear motion mechanism 3, a motor accommodating part 4b that accommodates the electric motor 2, and a separation wall 4c that separates the linear motion mechanism accommodating part 4a and the motor accommodating part 4b from each other are disposed. The motor accommodating part 4b is disposed on one end side, in the axial direction, of the housing 4, and the linear motion mechanism accommodating part 4a is disposed on the other end side, in the axial direction, of the housing 4.

The separation wall 4c is disposed so as to be perpendicular to the axial direction of the rotary input-output shaft 5, and has a through hole through which the rotary input-output shaft 5 is inserted from the linear motion mechanism accommodating part 4a into the motor accommodating part 4b. A motor cover 45, which closes an open end on the electric motor 2 side (the one end side in the axial direction) of the housing 4 in a state where the electric motor 2 is accommodated in the motor accommodating part 4b of the housing 4, is provided.

The stator 7 has a pair of excitation mechanisms 7A, 7B which are arranged so as to respectively face both surfaces, in the axial direction, of the rotor 8. Of these excitation mechanisms 7A, 7B, one of the excitation mechanisms on the separation wall 4c side is called a first excitation mechanism 7A, and the other of the excitation mechanisms on the motor cover 45 side is called a second excitation mechanism 7B. The first excitation mechanism 7A has a magnetic body core 10A, a back yoke 9A, and a coil 11A. The second excitation mechanism 7B has a magnetic body core 10B, a back yoke 9B, and a coil 11B.

The first excitation mechanism 7A will be described. In the motor accommodating part 4b inside the housing 4, the back yoke 9A is disposed so as to contact with the separation wall 4c, and the magnetic body core 10A is disposed so as to project in the axial direction from the back yoke 9A. A plurality of the magnetic body cores 10A are provided at fixed intervals in the circumferential direction. Each of the magnetic body cores 10A is made of a steel plate laminate or a powder magnetic core, for example. The coil 11A is wound around each of the magnetic body cores 10A.

The second excitation mechanism 7B will be described. In the motor accommodating part 4b inside the housing 4, the back yoke 9B is disposed so as to contact with the motor cover 45, and the magnetic body core 10B is disposed so as to project in the axial direction from the back yoke 9B. A plurality of the magnetic body cores 10B are also provided at fixed intervals in the circumferential direction similarly to the magnetic body cores 10A. The other configuration of the magnetic body core 10B and the coil 11B is the same as that of the magnetic body core 10A and the coil 11A described above. It is preferred to use the magnetic body core 10A and the magnetic body core 10B made of a steel plate laminate or a powder magnetic core, for example, because the torque per unit copper loss is improved. However, air core coils which are effective for reduction of the component cost and reduction of the torque fluctuation may be used, without using the magnetic body cores.

The rotor 8 is a disc-like member having permanent magnets 8a and a holding portion 8b holding the permanent magnets 8a, for example. The holding portion 8b is made from a non-magnetic material such as resin or stainless steel, for example. As described above, the stator 7 is configured as an excitation mechanism including a plurality of the coils 11A, 11B, the rotor 8 is configured as a magnetic field mechanism using the permanent magnets 8a, and the electric motor 2 is a permanent-magnet synchronous electric motor. Then, this configuration is excellent in the durability, the torque density, etc., and is considered to be suitable as an electric linear motion actuator.

The rotor 8 is fixed to the end portion of the rotary input-output shaft 5 of the linear motion mechanism 3. In the example shown in FIG. 1, on the outer circumferential surface of the end portion, of the rotary input-output shaft 5, extending into the motor accommodating part 4b, the rotor 8 is axially positioned and fixed between two retaining rings 24, 24. On the outer circumferential surface of the end portion of the rotary input-output shaft 5, annular grooves for fixing the two retaining rings 24, 24 are formed, respectively.

Consequently, by the retaining rings 24, 24, the rotor 8 is fixed to the rotary input-output shaft 5 at a position, in the axial direction, corresponding to a position between the first excitation mechanism 7A and the second excitation mechanism 7B. The rotation shaft of the electric motor 2 is disposed coaxially with the rotary input-output shaft 5 of the linear motion mechanism 3. The rotation-axis circumferential positioning structure for allowing transmission of torque from the rotor 8 to the rotary input-output shaft 5 can be realized by surface processing, splining, fitting friction force, welding, or the like, although the illustration is omitted.

The linear motion mechanism 3 will be described. In the linear motion mechanism accommodating part 4a of the housing 4, the most part of the linear motion mechanism 3 is incorporated. The linear motion mechanism 3 applies a braking force to a brake rotor described later, upon an output from the electric motor 2. The linear motion mechanism 3 converts rotary motion of the electric motor 2 to linear motion of the linear motion part 6 via the rotary input-output shaft 5.

The linear motion mechanism 3 has the rotary input-output shaft 5 that is rotationally driven by the electric motor 2, and a conversion mechanism part 31 that converts rotary motion of the rotary input-output shaft 5 to linear motion. The conversion mechanism part 31 has the linear motion part 6, a support member 32, a back plate 33 which is an annular thrust plate, a thrust bearing 34 that retains a reaction force against an axial load associated with linear motion of the linear motion part 6, a radial bearing 35, a carrier 36, slide bearings 37, 38, and a planetary roller 39.

The linear motion part 6 having a cylindrical shape is locked so as not to rotate and is supported in an axially movable manner by the inner circumferential surface of the linear motion mechanism accommodating part 4a. Spiral projections formed into a spiral shape projecting radially inward are provided on the inner circumferential surface of the linear motion part 6. A plurality of the planetary rollers 39 mesh with the spiral projections.

The support member 32 is provided on one end side, in the axial direction, of the linear motion part 6 in the linear motion mechanism accommodating part 4a. The support member 32 has a cylindrical boss portion and a flange portion extending radially outward from the boss portion. A plurality of the radial bearings 35 are fitted to the boss portion, and the rotary input-output shaft 5 is fitted to the inner diameter surfaces of inner rings of the radial bearings 35. The rotary input-output shaft 5 is supported by the support member 32 in a rotatable manner via the plurality of radial bearings 35.

The carrier 36 is provided on the inner circumference of the linear motion part 6 so as to be rotatable about the rotary input-output shaft 5. The carrier 36 is supported, in a rotatable manner, by the rotary input-output shaft 5 through the sliding bearings 37, 38 that are fitted between the carrier 36 and the rotary input-output shaft 5. A retaining ring 40 for retaining the axial position of the rotary input-output shaft 5 and the axial position of the carrier 36 relative to the support member 32 is provided on the end portion, in the axial direction, of the rotary input-output shaft 5.

To the carrier 36, a plurality of roller shafts 41 are provided so as to be spaced apart from each other in the circumferential direction. A plurality of shaft insertion holes are formed in each of opposite ends, in the axial direction, of the carrier 36. Each of the shaft insertion holes is formed as an oblong hole extending in the radial direction over a predetermined distance. Opposite axial ends of each of the roller shafts 41 are inserted in the corresponding shaft insertion holes so that the roller shafts 41 are supported so as to be movable in the radial direction within the ranges of the corresponding shaft insertion holes. An elastic ring 42 which urges the roller shafts 41 radially inward is extended over each of opposite axial ends of the plurality of roller shafts 41.

The planetary rollers 39 are rotatably supported by the respective roller shafts 41. Circumferential grooves or spiral grooves which mesh with the spiral projections of the linear motion part 6 are formed in the outer circumferential surfaces of the planetary rollers 39. The planetary rollers 39 are interposed between the outer circumferential surface of the rotary input-output shaft 5 and the inner circumferential surface of the linear motion part 6. By an urging force of the elastic ring 42, the planetary rollers 39 are pressed against the outer circumferential surface of the rotary input-output shaft 5. By the rotary input-output shaft 5 being rotated by the electric motor 2, the planetary rollers 39 in contact with the outer circumferential surface of the rotary input-output shaft 5 rotate due to contact friction therebetween. Accordingly, the linear motion part 6 moves in the axial direction so that a friction pad 43 (FIG. 7) provided at the end portion, in the axial direction, of the linear motion part 6 contacts with or separates from a brake rotor 44 (FIG. 7).

The control unit CU will be described. FIG. 2 is a block diagram showing a configuration example of a control system of the electric linear motion actuator 1. As shown in FIG. 2, the control unit CU is a device that controls the electric motor 2, and mainly has an actuator load controller 53, a thrust force applying section 54, a current converter 55, a current controller 56, and a motor driver 57. In addition thereto, the control unit CU also has a current estimator 58, an angle estimator 59, and an axial load estimator 60 serving as an axial force estimation functional part.

The actuator load controller 53 determines a motor torque necessary for following the estimated axial load of the linear motion mechanism 3 in response to a load command value, and outputs the motor torque as a motor torque command value. The load command value is provided, for example, from a higher-order control unit 61 of the control unit CU, on the basis of an operation amount of a braking operation part such as a not-illustrated brake pedal. As the higher-order control unit 61, for example, an electric control unit (ECU) that controls the entirety of the vehicle is employed. The estimated axial load is estimated, for example, by the axial load estimator 60 described later.

Specifically, the axial load estimator 60 is capable of estimating the estimated axial load, on the basis of a sensor output from a load sensor 62 that detects a pressing force when the friction pad 43 (FIG. 7) presses the brake rotor 44 (FIG. 7) by the linear motion part 6 (FIG. 1) of the linear motion mechanism 3. The load sensor 62 includes, for example, a magnetic sensor and a magnetic target. When the friction pad 43 presses the brake rotor 44, a reaction force toward the inboard side (FIG. 7) acts on the linear motion part 6. In a state where the electric brake device is mounted in the vehicle, the center side, in the vehicle width direction, of the vehicle is referred to as the inboard side, and the outer side, in the vehicle width direction, of the vehicle is referred to as an outboard side.

As shown in FIG. 2, the load sensor 62 that includes the magnetic sensor and the magnetic target magnetically detects the reaction force as a displacement in the axial direction. As the load sensor 62, a sensor, such as an optical, eddy-current, or capacitance sensor, other than the magnetic sensor, can be employed. The axial load estimator 60 is capable of estimating an estimated axial load by setting axial loads that are previously confirmed based on a relationship between the sensor output from the load sensor 62 and the axial load (thrust force) of the linear motion mechanism 3 by a test or the like, in the form of a table or the like.

The actuator load controller 53 determines a motor torque necessary for following an estimated axial load by appropriately using, for example, feedback control or feedforward control in response to a provided load command value. The estimated axial load can also be estimated, for example, from the relationship between the motor current estimated by the current estimator 58 and the motor angle estimated by the angle estimator 59.

The current estimator 58 has, for example, a first current sensor 58a configured to detect a motor current flowing in the coil 11A, and a second current sensor 58b configured to detect a motor current flowing in the coil 11B. Each of the current sensors 58a, 58b can be of, for example, a magnetic field detection type in which a magnetic field is detected by the current, or a voltage measurement type in which a voltage across opposite ends of a shunt resistor, FET, or the like is measured. The angle estimator 59 is capable of estimating an angle of the rotor 8 relative to the stator 7 from a sensor output from the angle sensor 63. As the angle sensor 63, for example, a resolver or an encoder can be used.

The thrust force applying section 54, which serves as an axial electromagnetic force controller, controls each coil current so as to apply a thrust force to the thrust bearing 34. The coil current is controlled such that a force acting in the axial direction of the rotary input-output shaft 5 (FIG. 1) due to interlinkage flux between the stator 7 (FIG. 1) and the rotor 8 causes generation of a force in the axial direction (on the left side or in the left-right direction in FIG. 1) acting on the thrust bearing 34 (FIG. 1).

FIG. 3 is a view schematically showing a principle for intentionally generating an axial force in an axial gap motor of the electric linear motion actuator. The actual orientation of magnetic poles and the route of action of force are omitted. FIG. 3 illustrates an example in which an electromagnetic force in the rotation axis direction is generated by a current component that is synchronous with the excitation magnetic flux of the double stator type axial gap motor having stators on both surface sides of the rotor 8, that is, by a d-axis current value in current vector control of a synchronous motor.

In the axial gap motor, when a d-axis excitation current that weakens the rotor magnetic flux is applied, a repulsive force is generated between the stator and the rotor 8. Conversely, in the axial gap motor, when a d-axis excitation current that enhances the rotor magnetic flux is applied, an attractive force is generated between the stator and the rotor 8. Therefore, by adjusting the d-axis current in the stators on the both surface sides such that an electromagnetic force is generated in the direction (on the left side or the left-right direction in FIG. 1) in which the electromagnetic force acts on the thrust bearing 34 (FIG. 1), the rotary input-output shaft 5 (FIG. 1) that is restrained relative to the rotor 8 is pressed against the thrust bearing 34 (FIG. 1) and the axial position thereof is retained.

In this method, for example, when current control can be performed independently for each of the stators on both surface sides, the respective d-axis currents can be adjusted such that the electromagnetic force acts in the axial direction. When only a synchronized current can be applied, for example, due to connection of the stators on both surfaces to a common terminal, one of the stators may be deviated from the other of the stators by a predetermined phase in the circumferential direction of the rotation shaft, for example.

In this case, since the current of the one of the stators is a weaker excitation side, and the current of the other of the stators is a stronger excitation side for a predetermined current phase, it is possible to generate an electromagnetic force in the rotation axis direction. At this time, the attractive force by the magnetic field mechanism and the electromagnetic force by the q-axis current are substantially balanced in the left-right direction in FIG. 3 as long as the rotor 8 is almost close to the mid-position between both the stators, and is parallel with the stators. Therefore, it can be considered that the electromagnetic force by the d-axis current mainly acts. The double stator type axial gap motor illustrated in the drawings is considered to be preferable because the aforementioned method can be easily performed. However, the double rotor type one described later can be also used by, for example, stator winding being arranged in two lines in the rotation axis direction.

As illustrated in FIG. 2, in the control unit CU of the electric linear motion actuator 1, the current control can be performed independently for each of the stators on both surfaces. In other words, the excitation magnetic flux can be controlled independently for the respective first and the second excitation mechanisms 7A, 7B (FIG. 1) by the control unit CU.

The thrust force applying section 54 has an execution determiner 54a and a d-axis current addition value determiner 54b. The execution determiner 54a determines the necessity of generating an electromagnetic force in the axial direction required for restraining the rotor 8 and the rotary input-output shaft 5 (FIG. 1) to the thrust bearing 34 (FIG. 1) with appropriate reference to a motor torque command value outputted from the actuator load controller 53 and an estimated axial load from the axial load estimator 60.

When the execution determiner 54a determines that there is a necessary of generating an electromagnetic force in the axial direction, the d-axis current addition value determiner 54b determines a d-axis current for that. For example, in a region where a pre-load onto the thrust bearing 34 (FIG. 1) by the axial load (axial force) of the linear motion mechanism 3 is lower, a pre-load by the electromagnetic force in the axial direction is required. Therefore, it is considered to be preferable that the d-axis current addition value determiner 54b executes a process such that, as estimated braking force fall below a predetermined, the d-axis current addition value is increased accordingly.

The current converter 55 derives a current command value to be applied to the plurality of coils 11A, 11B from a motor torque command value calculated by the actuator load controller 53, and a d-axis current addition value determined by the thrust force applying section 54 for generating an electromagnetic force in the axial direction. The current converter 55 has a first d-axis current determiner 64 and a first q-axis current determiner 65, and a second d-axis current determiner 66 and a second q-axis current determiner 67. The first d-axis current determiner 64 and the first q-axis current determiner 65 respectively derive a d-axis current command value and a q-axis current command value for the coil 11A of the first excitation mechanism 7A (FIG. 1). The second d-axis current determiner 66 and the second q-axis current determiner 67 respectively derive a d-axis current command value and a q-axis current command value for the coil 11B of the second excitation mechanism 7B (FIG. 1).

When each current command value is derived, each d-axis current addition value may be a lower field current of the excitation mechanism 7A (7B) on one side, or may be distributed to the excitation mechanisms 7A, 7B on both sides as a lower field current and a higher field current having a predetermined difference therebetween. The former case, that is, the case where each d-axis current addition value is a lower field current of the excitation mechanism 7A (7B) on one side is preferable when the electric motor output is not reduced so as to prevent increase of the induction voltage of the electric motor 2. The latter case is preferable when the loss by the d-axis current for generating an electromagnetic force in the axial direction is to be reduced.

Therefore, for example, it is considered to be preferable to perform a process such that the use of a lower field current is increased according to the absolute value of the motor angular velocity being greater because deterioration in motor performance is inhibited. The motor angular velocity is determined by differentiating the motor angle estimated by the angle estimator 59. It is considered to be preferable to previously prepare a lookup table (abbreviated as LUT) or the like according to results of analysis, test, or the like such that the parameter therein can be referred to as appropriate when the current command value is derived since this will reduce the calculation load.

The current controller 56 includes a first current controller 56a and a second current controller 56b. The first current controller 56a and the second current controller 56b output motor voltages for follow-control with respect to current command values, on the basis of current estimation results of the corresponding coils 11A, 11B, respectively. The calculation for outputting the motor voltage uses feedback control or feedforward control as appropriate. The current of the coil 11A is estimated by the first current sensor 58a. The current of the coil 11B is estimated by the second current sensor 58b. It is considered to be preferable that each of the calculation units including the controller is implemented by a calculation unit such as a microcomputer, a FPGA, and an ASIC because high-performance control is realized at low cost.

The motor driver 57 converts direct current from a not-illustrated power supply unit to three-phase AC power to be used for driving the electric motor 2. The motor driver 57 includes a first motor driver 57a and a second motor driver 57b. The first motor driver 57a outputs AC power to the coil 11A, and the second motor driver 57b outputs AC power to the coil 11B. It is considered to be preferable that the first motor driver 57a and the second motor driver 57b are configured by a half bridge circuit using, for example, a switching device such as a FET. In addition, it is considered to be preferable that PWM control in which an ON-OFF signal of a switch on each of a high side and a low side is inputted from the first current controller 56a and the second current controller 56b is used. This is because high-precision control can be realized at low cost.

The section, the controllers, the converter, and the estimators in the control unit CU are specifically configured by a hardware circuit or a software function on a processor (not illustrate) capable of performing calculation and outputting the result, using a LUT (Look Up Table) implemented by software or hardware, or a predetermined transform function stored in a library of software, or hardware equivalent thereto, and optionally a comparison function or four arithmetic operation function in the library, hardware equivalent thereto, or the like.

In the electric linear motion actuator 1 as described above, the electric motor 2 is a so-called axial gap motor, and the linear motion mechanism 3 and the electric motor 2 are arranged in the axial direction with the rotary input-output shaft 5 of the linear motion mechanism 3 interposed therebetween. Therefore, it is possible to realize an electric linear motion actuator that allows space saving to be achieved by reducing an unnecessary space, and allows a moment of inertia to be reduced and responsiveness to be enhanced as compared with, for example, a structure in which an electric motor is disposed, for example, on the outer circumference of the actuator.

The thrust force applying section 54 of the control unit CU applies a thrust force such that the sum of the force acting in the axial direction of the rotary input-output shaft 5 due to interlinkage flux between the stator 7 and the rotor 8 causes generation of a force, in the axial direction, acting on the thrust bearing 34. In this manner, a thrust force is intentionally applied to the linear motion mechanism 3 in such a direction that the thrust force of the axial gap motor can be supported by the existing thrust bearing 34. This makes it possible to simplify a support structure for a thrust force, and to reduce the cost.

Since the rotation axis or shaft of the electric motor 2 is disposed coaxially with the rotary input-output shaft 5 of the linear motion mechanism 3, the rotary input-output shaft 5 of the linear motion mechanism 3 can serve also as a rotation shaft of the electric motor 2. This makes it possible to reduce the number of components associated with supporting of a thrust force, and to achieve space saving and cost reduction.

Other embodiments will be described. In the following description, in each embodiment, portions corresponding to the configuration previously described are denoted by the same reference numerals, and the repeated description thereof is omitted. When only a part of a configuration is described, the remaining part of the configuration is the same as that of the previously described embodiment unless otherwise specified. The same advantageous effect is achieved by the same configuration. In addition to the combinations of portions described specifically in the respective embodiments, it is also possible to partially combine the embodiments unless any problem is not particularly caused by the combinations.

Figure 4:
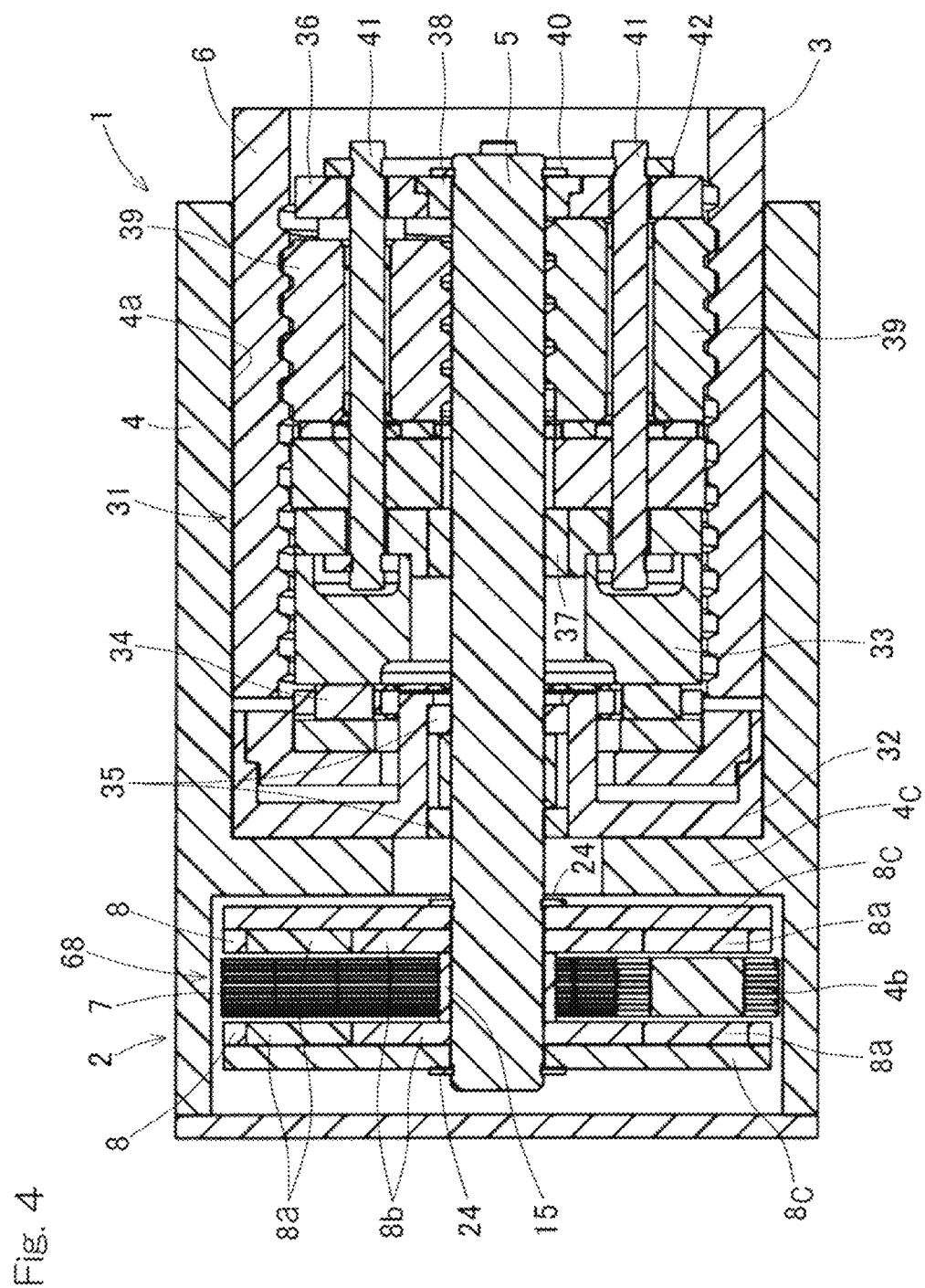
FIG. 4 is a longitudinal-sectional view of an electric linear motion actuator according to another embodiment of the present invention (double rotor)

FIG. 4 is a longitudinal-sectional view of the electric linear motion actuator 1 according to another embodiment. In the illustrated example, in the electric linear motion actuator 1, an axial gap motor having a double rotor structure in which the stator 7 having magnetic poles on both surfaces in the axial direction is disposed in the midposition, and the rotors 8, 8 are disposed on both sides of the stator 7, is used as the electric motor 2. While the thrust force applying section is provided in the control unit in the aforementioned embodiment, a thrust force generator 68 is provided in the electric motor 2 in the example shown in FIG. 4. This structure is preferred for reducing the copper loss.

Each rotor 8 includes the permanent magnet 8a, the holding portion 8b holding the permanent magnet 8a, and a back yoke 8c. On the outer circumferential surface of the end portion of the rotary input-output shaft 5, annular grooves that fit to the two retaining rings 24, 24 are provided, and a collar 15 is disposed in contact with the outer circumferential surface, and the rotors 8, 8 are each positioned and fixed in the axial direction between the retaining ring 24 and the collar 15. The stator 7 is disposed, for example, inside the motor accommodating part 4b and is disposed so as to contact with the motor accommodating part 4b.

The thrust force generator 68 is configured in a positional relationship such that gaps (spaces) between the stator 7 and the rotors 8, 8 differ in size in the torque generating surface, and the thrust force generated by the thrust force generator 68 is generated by an imbalance, depending on the size of the gap, of the magnetic attractive force in the torque generating surface.

By setting the positional relationship such that the position of the stator 7 approaches either one of the rotors on the both surface sides of the stator 7, a force in a predetermined direction is generated by imbalance in magnetic attractive force of the field magnetic flux. By conforming the predetermined direction to the direction for acting on the thrust bearing 34, the axial positions of the rotors 8, 8 and the rotary input-output shaft 5 are constantly retained by the thrust bearing 34.

Figure 5:
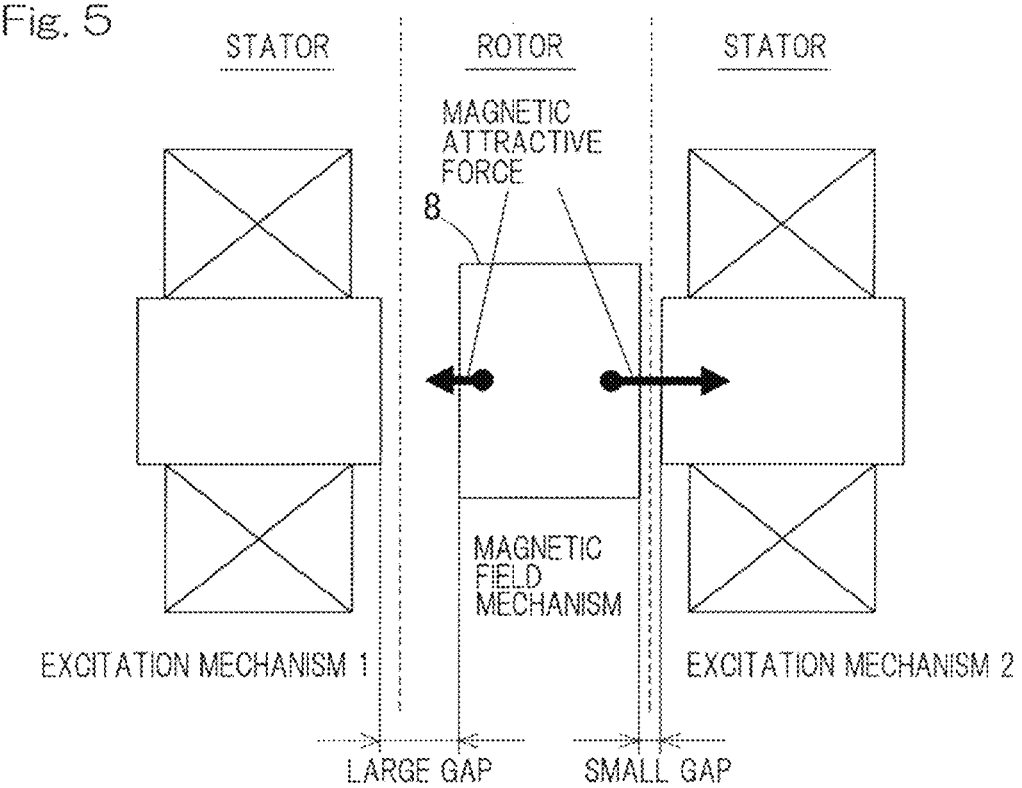
FIG. 5 is a view schematically showing a principle for intentionally generating an axial force in an axial gap motor of the electric linear motion actuator according to another embodiment of the present invention (double stator)

The configuration shown in FIG. 4 in which the thrust force generator 68 is provided in the electric motor 2 can be implemented in a similar manner even when a double stator type is used. As illustrated in FIG. 5, by setting a positional relationship such that the rotor 8 approaches either one of the stators in the double stator type axial gap motor having torque generating surfaces on both surfaces in the axial direction, a force in a predetermined direction is generated by imbalance in magnetic attractive force of the field magnetic flux. By conforming the predetermined direction to the direction for acting on the thrust bearing 34 (see FIG. 4), the axial positions of the rotor 8 and the rotary input-output shaft 5 (see FIG. 4) are constantly retained by the thrust bearing 34 (see FIG. 4).

In the electric linear motion actuator including a control unit CU and the thrust force applying section 54 in the control unit CU as described in the foregoing embodiment, the thrust force generator 68 according to the present embodiment may be disposed. In this case, when malfunction occurs in either one of the operation by the thrust force applying section 54 and the operation by the thrust force generator 68, a backup function can be carried out, and/or a fail-safe function can be carried out, by the other of the section and generator.

Figure 6:
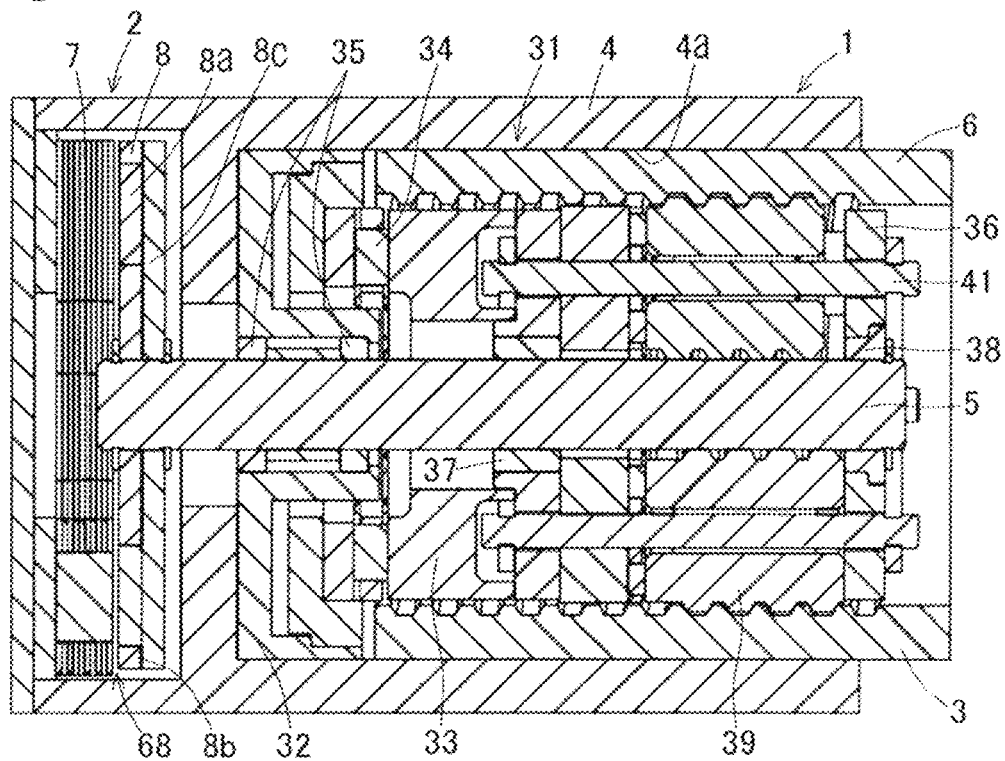
FIG. 6 is a longitudinal-sectional view of an electric linear motion actuator according to still another embodiment of the above-mentioned present invention.

FIG. 6 illustrates still another embodiment using a single rotor type axial gap motor in which each of the stator 7 and the rotor 8 has a torque generating surface on either one surface. The thrust force generator 68 of the present embodiment generates a thrust force by arranging the stator 7 and the rotor 8 in such a positional relationship that the attractive force is generated in the axial direction for acting on the thrust bearing 34. As a result, the axial positions of the rotor 8 and the rotary input-output shaft 5 are constantly retained by the thrust bearing. This structure is preferred in configuring a more space-saving actuator when the required motor torque is relatively small.

FIG. 7 is a partially cutaway longitudinal-sectional view of an electric brake device provided with either of the electric linear motion actuators 1 described above. The electric brake device is basically provided with any one of the electric linear motion actuators 1 described above, the brake rotor 44 which is a rotary member that rotates integrally with a wheel, and the friction pad (friction member) 43 that generates a braking force by coming into contact with the brake rotor 44. The electric brake device is further provided with a not-illustrated control device that controls the electric linear motion actuator. In the vehicle, calipers 51 are provided so as to surround the outer circumferential side portion of the brake rotor 44. The caliper 51 are provided integrally with the housing 4 of the electric linear motion actuator 1.

A claw portion 52 is provided on an outboard side end of the caliper 51. The claw portion 52 faces, in the axial direction, an outboard side lateral surface of the rotor 44. The friction pad 43 on the outboard side is supported by the claw portion 52. The friction pad 43 on the inboard side is supported by the outboard side end of the linear motion part 6 of the linear motion mechanism 3 in the caliper 51. The friction pad 43 faces, in the axial direction, an inboard-side lateral surface of the brake rotor 44. The electric linear motion actuator 1 performs driving so as to cause the friction pads 43 to be brought into contact with or be separate from the brake rotor 44.

A mount (not illustrated) is supported by a not-illustrated knuckle of a vehicle. A pair of pin support pieces (not illustrated) are provided on opposite ends, in the longitudinal direction, of the mount. A not-illustrated slide pin extending in parallel with the axial direction is provided at an end portion of each of the pin support pieces. The caliper 51 is supported by the slide pins so as to be slidable in the axial direction.

The control device controls rotation of the electric motor of the electric linear motion actuator 1 according to the operation amount of a not-illustrated brake pedal. During braking, driving by the electric linear motion actuator 1 causes the friction pad 43 on the inboard side to contact with the brake rotor 44 and press the brake rotor 44 in the axial direction. The caliper 51 slides toward the inboard side with the reaction force of the pressing force. Accordingly, the friction pad 43, on the outboard side, supported by the claw portion 52 of the caliper 51 comes into contact with the brake rotor 44. The friction pads 43, 43 on the outboard side and the inboard side firmly hold the brake rotor 44 from both sides in the axial direction so that a braking force is imposed on the brake rotor 44.

According to this configuration, space saving of the electric linear motion actuator 1 can be achieved. Thus, the electric brake device can be mounted also in a vehicle in which a mounting space for the electric linear motion actuator 1 is extremely limited. Consequently, availability of the electric brake device can be enhanced so that the electric brake device can be mounted in various vehicles. Since the electric linear motion actuator 1 allows simplification of the support structure for a thrust force and reduction of the cost, it is possible to reduce the cost for the entirety of the electric brake device.

The double stator type axial gap motor, for example may have a structure in which the method shown FIG. 3, for generating the electromagnetic force in the rotation axis direction by the d-axis current value, and the method shown FIG. 5, for generating the force in the axial direction by the attractive force of the field magnetic flux, are used in combination. For example, in order to address the case where a d-axis current that is enough to generate an electromagnetic force in the axial direction cannot be applied in the method shown in FIG. 3, the method shown in FIG. 5 may be used in combination as appropriate, thereby retaining the axial positions of the rotor and the rotary input-output shaft more reliably.

The rotor, in which a holding portion made from a non-magnetic material holds permanent magnets, is considered to be preferable because of small loss. However, a holding portion made from a magnetic material can also hold the permanent magnets. The rotor may have a structure in which a single magnet magnetized at a plurality of magnetic poles in the axial direction is directly fixed to the rotation input-output shaft, without using the holding portion. Regarding the permanent magnet of the rotor, it is preferred to use a magnet penetrating in the axial direction, and to use the both surfaces of the magnetic poles as the interlinkage flux for reducing the volume of the magnet, the size of the motor, and the number of components, and thus for reducing the cost and achieving space saving. However, a structure in which magnets are adhered to both surfaces of the magnetic body to improve heat resistance may be used.

For example, the electric motor may be structured as a DC motor in which permanent magnets are used for a stator, and coils and brushes, etc., are used for a rotor. Alternatively, the electric motor may be structured as a reluctance motor using a core having a shape which causes the stator inductance to change with rotation of a rotor.

As the conversion mechanism unit of the linear motion mechanism, in addition to the planetary rollers, various screw mechanisms such as a ball screw, a mechanism using a slope of a ball ramp, or the like may be adopted. While the thrust bearing in each embodiment is arranged on the assumption that an object is pressed by the electric linear motion actuator, the thrust bearing may be arranged to bear a load on the side opposite to that in the illustrated example, to configure an actuator that applies a tensile load to the object.

While the sensors for detecting the motor angle and the axial load of the linear motion mechanism are provided, for example, a sensorless angle estimator configured to estimate a motor angle from a motor voltage, or an estimator configured to estimate an axial load from an actuator efficiency, a motor current, or the like may be used. Components necessary for application of the electric linear motion actuator, such as a thermistor and wiring parts for an electrical system, are provided as appropriate.

In the electric brake device, components necessary for the electric brake, such as a redundancy mechanism, a power supply system, and a sensor are provided as appropriate. While the example in which a plurality of feedback loops are configured as the control calculation is described, the configuration of the control system is determined as appropriate depending on the necessity. For example, a single feedback system that collectively processes all of the electromagnetic characteristics and motion characteristics of the electric motor can be employed. The electric linear motion actuator of each embodiment mentioned above can be applied to a device, such as a press device, other than the electric brake device.

Although the present invention has been fully described in connection with the preferred embodiments thereof with reference to the accompanying drawings, various additions, modification, and deletions can be made without departing from the scope of the present invention. Accordingly, such additions, modification, and deletions are to be construed as also included in the scope of the present invention.

REFERENCE NUMERALS

1 . . . electric linear motion actuator
2 . . . electric motor
3 . . . linear motion mechanism
4 . . . housing
5 . . . rotary input-output shaft
6 . . . linear motion part
7 . . . stator
7A, 7B . . . first, second excitation mechanism
8 . . . rotor
8a . . . permanent magnet
11A, 11B . . . coil
34 . . . thrust bearing
60 . . . axial load estimator (axial force estimation functional part)
54 . . . thrust force applying section
68 . . . thrust force generator
CU . . . control unit

What is claimed is:

1. An electric linear motion actuator comprising:
an electric motor;
a linear motion mechanism, having a rotary input-output shaft, configured to convert rotary motion of the electric motor to linear motion of a linear motion part via the rotary input-output shaft;
a housing configured to hold the linear motion mechanism; and
a control unit configured to control the electric motor, wherein
the linear motion mechanism and the electric motor are arranged in an axial direction with the rotary input-output shaft of the linear motion mechanism interposed therebetween,
the electric motor has a stator and a rotor arranged such that orientation of a magnetic pole which generates interlinkage flux contributing to generating torque is parallel with a rotation shaft in the electric motor,
the linear motion mechanism has a thrust bearing for retaining a reaction force against a load in the axial direction in association with linear motion of the linear motion part, and
the control unit is provided with an excitation adjusting section for adjusting a current of the stator to perform weakening excitation and strengthening excitation, by which the current of the stator is adjusted to apply a thrust force such that a sum of forces acting in the axial direction of the rotary input-output shaft due to interlinkage flux between the stator and the rotor is intentionally controlled so as to cause generation of a force, only in the axial direction, to be applied to the thrust bearing.

2. The electric linear motion actuator as claimed in claim 1, wherein the rotation shaft of the electric motor is disposed coaxially with the rotary input-output shaft of the linear motion mechanism.

3. The electric linear motion actuator as claimed in claim 1, wherein
the rotor is a magnetic field mechanism having torque generating surfaces on both surfaces, respectively, in the axial direction of the rotor,
the stator is disposed on both the surfaces, respectively, in the axial direction, of the magnetic field mechanism, and have a pair of excitation mechanisms for which excitation magnetic flux can be independently controlled, and
the thrust force applied by the excitation adjusting section is an electromagnetic force generated by the excitation magnetic fluxes of the pair of excitation mechanisms satisfying different magnetic flux conditions, respectively.

4. The electric linear motion actuator as claimed in claim 3, wherein
the rotor is a magnetic field mechanism having a permanent magnet,
one or both of the pair of excitation mechanisms have coils that form a magnetic circuit corresponding to three-phase alternating current,
the excitation adjusting section has a function of controlling current amplitude and phase of the three-phase alternating current of the coils that are independent of each other with respect to the magnetic poles of the magnetic field mechanism, or values corresponding thereto, and the thrust force applied by the excitation adjusting section is an electromagnetic force generated by a current component of the coil corresponding to the excitation magnetic flux in a direction corresponding to the magnetic pole of the magnetic field mechanism.

5. The electric linear motion actuator as claimed in claim 3, wherein the control unit has an axial force estimation functional part that estimates an axial force of the linear motion mechanism, and the excitation adjusting section causes generation of the electromagnetic force by adjusting the excitation magnetic flux when the axial force of the linear motion mechanism estimated by the axial force estimation functional part is less than or equal to a predetermined magnitude.

6. The electric linear motion actuator as claimed in claim 1, wherein the electric motor further includes an imbalanced magnetic attractive force generator to generate an imbalance in a magnetic attractive force in a positional relationship in which a thrust force is generated such that the force acting in the axial direction of the rotary input-output shaft due to interlinkage flux between the stator and the rotor causes generation of a force, only in in the axial direction, to be applied to the thrust bearing.

7. An electric brake device comprising:
the electric linear motion actuator as claimed in claim 1;
a brake rotor; and
a friction member configured to generate a braking force by coming into contact with the brake rotor.

8. An electric linear motion actuator comprising:
an electric motor;
a linear motion mechanism, having a rotary input-output shaft, configured to convert rotary motion of the electric motor to linear motion of a linear motion part via the rotary input-output shaft; and
a housing configured to hold the linear motion mechanism, wherein the linear motion mechanism and the electric motor are arranged in an axial direction with the rotary input-output shaft of the linear motion mechanism interposed therebetween, the electric motor has a stator and a rotor arranged such that orientation of a magnetic pole which generates interlinkage flux contributing to generating torque is parallel with a rotation shaft in the electric motor, the linear motion mechanism has a thrust bearing for retaining a reaction force against a load in the axial direction in association with linear motion of the linear motion part, and the electric motor includes an imbalanced magnetic attractive force generator to generate an imbalance in a magnetic attractive force in a positional relationship in which a thrust force is generated such that a force acting in the axial direction of the rotary input-output shaft due to interlinkage flux between the stator and the rotor causes generation of a force, only in the axial direction, to be applied to the thrust bearing, wherein one of the stator and the rotor has torque generating surfaces on both surfaces, respectively, in the axial direction, and the other of the stator and the rotor is arranged on each side, in the axial direction, facing the one of the stator and the rotor having the torque generating surfaces, and the imbalanced magnetic attractive force generator is configured to have a positional relationship such that gaps between the stator and the rotor differ in size in the torque generating surfaces, and the thrust force generated by the imbalanced magnetic attractive force generator is generated by an imbalance, based on a size of each of the gaps, in the magnetic attractive force in the torque generating surfaces.

9. An electric brake device, comprising:
the electric linear motion actuator as claimed in claim 8;
a brake rotor; and
a friction member configured to generate a braking force by coming into contact with the brake rotor.

* * * * *

UNITED STATES PATENT AND TRADEMARK OFFICE
CERTIFICATE OF CORRECTION

PATENT NO.         : 11,060,576 B2                                       Page 1 of 1
APPLICATION NO.    : 16/198505
DATED              : July 13, 2021
INVENTOR(S)        : Yui Masuda It is certified that error appears in the above-identified patent and that said Letters Patent is hereby corrected as shown below:

In the Claims

Column 19, Line 27:
In Claim 6, delete "in in" and insert -- in --, therefor.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*